United States Patent Office 3,187,012
Patented June 1, 1965

3,187,012
PROCESS FOR PREPARING 2-HYDROXYMETHYL-TETRAHYDROPYRAN
Andrew P. Dunlop, Riverside, and Donald G. Manly, Barrington, Ill., assignors to The Quaker Oats Company, Chicago, Ill., a corporation of New Jersey
No Drawing. Filed May 15, 1961, Ser. No. 109,834
8 Claims. (Cl. 260—345.9)

This invention relates to an improved process for producing 2-hydroxymethyltetrahydropyran from acrolein dimer or 2-hydroxymethyldihydropyran. More specifically it relates to a process for producing 2-hydroxymethyltetrahydropyran by treating acrolein dimer or 2-hydroxymethyldihydropyran in the vapor phase with gaseous hydrogen in contact with a catalyst.

2-hydroxymethyltetrahydropyran is a known compound which finds use as a solvent and as a material used in forming esters for plasticizers.

One of the objects of this invention is to provide a continuous, vapor phase process for hydrogenating acrolein dimer and 2-hydroxymethyldihydropyran to 2-hydroxymethyltetrahydropyran.

Another object of this invention is to provide a truly continuous process for hydrogenating acrolein dimer or 2-hydroxymethyldihydropyran under such conditions that the desired 2-hydroxymethyltetrahydropyran may be recovered directly without additional processing to filter off the catalyst and distill off the product.

An additional object is to provide a process for producing 2-hydroxymethyltetrahydropyran where high yields and substantially complete conversions are obtained.

A further object of this invention is to produce 2-hydroxymethyltetrahydropyran whereby high pressures are not necessary.

A still further object of this invention is to provide a process for producing 2-hydroxymethyltetrahydropyran that employs relatively inexpensive materials and equipment.

Still another object of this invention is to provide a process for producing 2-hydroxymethyltetrahydropyran in which the employment of a relatively short period for contacting the reactants and the catalyst does not sacrifice substantially complete conversions.

Further and additional objects will appear from the following description and accompanying claims.

In accordance with the invention these objects are accomplished by contacting a feed compound selected from the group consisting of acrolein dimer and 2-hydroxymethyldihydropyran or mixtures of the same in the vapor phase and under hydrogenation conditions in the presence of a nickel catalyst. In converting acrolein dimer or 2-hydroxymethyldihydropyran to 2-hydroxymethyltetrahydropyran according to this invention, the temperature employed is between about 25° C. and about 170° C. and preferably between about 25° C. and about 155° C. Hydrogen is supplied to the reaction in a stoichiometric excess, preferably in such a quantity that the molar ratio of hydrogen to the feed compound is between about 15:1 and about 125:1. The reactants are passed to the catalytic reaction zone in the vapor phase and the reaction is carried out at low pressures which may range from subatmospheric up to about 5 atmospheres. Preferably the pressure is between about one and three atmospheres or sufficient pressure to move the vaporous reactants through the catalyst bed. It is also preferred that the maximum feed rate of the feed compound is not substantially in excess of 0.20 parts per hour per part of catalyst.

The feed compound that can be used in this invention is either acrolein dimer or 2-hydroxymethyldihydropyran.

Acrolein dimer is also referred to as 3,4-dihydro-2H-pyran-2-carboxaldehyde and has the following formula:

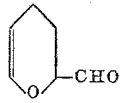

The other feed compound, 2-hydroxymethyldihydropyran, is sometimes referred to as 3.4-dihydro-2H-pyran-2-methanol and has the following formula:

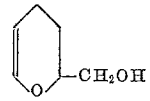

In a more specific embodiment of this invention, the nickel catalyst, prior to the contacting with the feed compounds, is reduced at a temperature below 450° C., reoxidized by passing a gas containing free oxygen over the reduced catalyst, and again reduced by passing a gas thereover containing free hydrogen at a temperature below about 250° C.

In another more specific embodiment of this invention the catalyst is nickel hydrate which has been reduced at a temperature below about 450° C., partially reoxidized by passing a gas containing free oxygen thereover, and again reduced by passing a gas thereover containing free hydrogen at a temperature below about 250° C.

In a preferred embodiment subsequent to reducing the nickel catalyst at a temperature below about 450° C., as described above, the nickel catalyst material is partially reoxidized by passing a gas containing free oxygen thereover until the ratio of reduced nickel to total nickel is about 55%. The final reduction step is then repeated as described above.

The nickel catalyst employed in this invention may be used as such or it may be supported on any suitable support, such as kieselguhr, alumina, pumice, alundum, charcoal or the various natural or synthetic clay-like supports that are well known to the art. In addition, the catalyst composition may be modified if desired to incorporate certain basic substances such as sodium silicate, calcium oxide, magnesium oxide or the like.

While it is characteristic of the process of this invention that substantially 100% conversions can be obtained at relatively low average hydrogenating temperatures, e.g. about 25° C to 150°, in practice the exothermic nature of the reaction usually results in the formation of a hot zone in the catalyst bed at and/or adjacent the reaction front, the temperature of which may be substantially above the minimum and preferred temperature for obtaining substantially 100% conversion. The maximum temperature of such hot zones should be controlled so as not to exceed the temperature (about 170° C.) at which undesired side reactions occur to an extensive degree.

The invention will be further illustrated but is not limited by the following examples in which "parts" means parts by weight and percentages are by weight, unless otherwise indicated. Feed rate, where given in the examples, is in parts of the feed compound per hour per part of catalyst. Two types of temperature data are reported in the examples: (1) the temperature of the circulating oil in a jacket surrounding the catalyst chamber, and (2) the highest temperature of the catalyst bed, referred to as the hot zone temperature.

The hot zone temperatures shown in the examples that follow were obtained by means of a roving thermocouple in the catalyst bed. The temperatures stated are based on observations of the highest temperatures encountered as the thermocouple in moved through the catalyst bed.

While the temperatures are the highest temperatures read, it should be understood that they are not necessarily the highest temperatures at the individual catalytic sites of each catalyst pellet. Limitations of standard temperature-measuring equipment prevent further definitive information in this regard. The integrated average temperature of the entire catalyst bed is, of course, substantially less than the maximum permissible hot zone temperature indicated below in the examples.

The results in the examples below are reported in terms of the conversion of the feed compound and the yield of 2-hydroxymethyltetrahydropyran (percent of theoretical). Percent of conversion is here defined as the initial weight of the feed compound minus the weight of the feed compound in the product divided by the initial weight of the feed compound times 100.

Percent yield is defined as follows, where HMTHP is 2-hydroxymethyltetrahydropyran:

$$\frac{\text{Weight of HMTHP in product}}{\text{Weight of feed compound fed} \times \frac{\text{Molecular weight of PHMTH}}{\text{Molecular weight of feed compound}}} \times 100$$

*Example 1*

A specially reduced and stabilized nickel catalyst was prepared by the following procedure. Unreduced nickel kieselguhr tablets were loaded into a vertical reactor. The system was purged with nitrogen and brought to about 260° C. Hydrogen flow was started and the temperature gradually increased to about 427° C. This temperature was maintained by circulating the hydrogen through an external heater. It was necessary to dry the circulating gases by passing them through an external dryer. When the formation of water had virtually stopped, the system was cooled to about 32° C. while maintaining hydrogen flow. When the system had reached this temperature it was purged with nitrogen. The reduced catalyst was partially reoxidized by adding a small quantity of oxygen with the inert gas. The temperature was maintained below about 57° C. by adjusting the amount of oxygen present. The peak temperature was measured and when that temperature reached the bottom of the reactor the stabilization was complete. After stabilization the system was flushed with air to atmospheric conditions. In this form the catalyst contained about 60% nickel with a ratio of reduced nickel to total nickel of about 55%.

The reduced and stabilized catalyst was charged into a column heated by means of a circulating oil in a jacket surrounding the column. The catalyst was reduced by passing pure hydrogen down through the column starting at about 140° C. Over a period of four hours the temperature was gradually raised to about 200° C. and held until no further water was given off. After reduction of the catalyst the temperature was lowered to less than 120° C. Acrolein dimer was then vaporized into a stream of preheated hydrogen by introducing the acrolein dimer into a heated vaporizing chamber through which the preheated hydrogen was passed. The resulting mixture was then passed through the catalyst column as a vapor. The operating pressure was about one to two pounds per square inch gauge which was just enough to cycle the vapor through the system. The vapor stream emerging from the catalyst column was passed through a condenser into a chilled container to condense the reaction product.

The foregoing process was carried out under conditions wherein the acrolein dimer was fed at a rate of 0.078 part per hour per part catalyst, the molar ratio of hydrogen to acrolein dimer was 48:1, and the temperature of the reaction column was maintained at about 120° C., as indicated by the temperature of the circulating oil in the surrounding jacket, which circulating oil temperature is a rough approximation of the integrated average temperature of the catalyst bed. The temperature of the hot zone in the catalyst bed was maintained below 140° C. The conversion of acrolein dimer was 100%, and the yield of 2-hydroxymethyltetrahydropyran was 98% of theoretical.

*Example 2*

The procedure of Example 1 was repeated with the following exceptions: (1) The temperature of the circulating oil was maintained at 140° C., and (2) the temperature of the hot zone in the catalyst bed was maintained below 160° C. The conversion of acrolein dimer was 100%, and the yield of 2-hydroxymethyltetrahydropyran was 90% of theoretical.

*Example 3*

The procedure of Example 1 was repeated with the following exceptions: (1) The temperature of the circulating oil was maintained at 150° C., and (2) the temperature of the hot zone in the catalyst bed was maintained below 170° C. The conversion of acrolein dimer was 100%, and the yield of 2-hydroxymethyltetrahydropyran was 63% of theoretical.

*Example 4*

The procedure of Example 1 was repeated with the following exceptions: (1) The temperature of the circulating oil was maintained at 80° C., and (2) the temperature of the hot zone in the catalyst bed was maintained below 100° C. The conversion of acrolein dimer was 100%, and the yield of 2-hydroxymethyltetrahydropyran was 99% of theoretical.

*Example 5*

The procedure of Example 1 was repeated with the following exceptions: (1) The temperature of the circulating oil was maintained at 75° C., (2) the molar ratio of hydrogen to acrolein dimer was 150:1, and (3) the feed rate was 0.036. The conversion of acrolein dimer was 100%, and the yield of 2-hydroxymethyltetrahydropyran was 98% of theoretical.

*Example 6*

The procedure of Example 1 was repeated with the following exceptions: (1) 2-hydroxymethyldihydropyran was employed as the feed compound, (2) the temperature of the circulating oil was maintained at 81° C., and (3) the molar ratio of hydrogen to 2-hydroxymethyldihydropyran was 36:1. The conversion of 2-hydroxymethyldihydropyran was 100%, and the yield of 2-hydroxymethyltetrahydropyran was 95% of theoretical.

From the examples it is apparent that the invention advances the art of producing 2-hydroxymethyltetrahydropyran to a considerable degree. The yield of 2-hydroxymethyltetrahydropyran is substantially quantitative; substantially 100% conversions can be obtained in a relatively short contacting period of the reactants and the catalyst; high pressures need not be employed; relatively inexpensive materials and equipment are employed; and of further importance, the process is continuous and the recover of the product is simple and direct.

We claim:

1. A process for producing 2-hydroxymethyltetrahydropyran which comprises contacting a feed compound selected from the group consisting of acrolein dimer and 2-hydroxymethyldihydropyran, in the vapor phase with hydrogen, said contacting being at a temperature between about 25° C. and 170° C. and at a pressure of less than 5 atmospheres, in the presence of a nickel catalyst which has been reduced at a temperature below about 450° C., reoxidized by passing a gas containing free oxygen over the reduced catalyst, and again reduced by passing a gas thereover containing free hydrogen at a temperature below about 250° C.

2. A process according to claim 1 in which said contacting employs a molar ratio of hydrogen to said feed compound of between about 15:1 and 125:1.

3. A process according to claim 1 in which the feed compound is contacted with hydrogen at a temperature between about 25° C. and about 155° C.

4. The process of claim 1 in which said catalyst is nickel hydrate which has been reduced at a temperature below about 450° C., partially reoxidized by passing a gas containing free oxygen thereover, and again reduced by passing a gas thereover containing free hydrogen at a temperature below about 250° C.

5. The process of claim 1 in which said nickel catalyst has been reduced at a temperature below about 450° C., partially reoxidized by passing a gas containing free oxygen thereover until the ratio of reduced nickel to total nickel is about 55%, and again reduced by passing a gas thereover containing free hydrogen at a temperature below about 250° C.

6. A process according to claim 1 in which the maximum feed rate of the feed compound is not substantially in excess of 0.2 part by weight per hour per part by weight of catalyst.

7. A process for producing 2-hydroxymethyltetrahydropyran which comprises contacting acrolein dimer in the vapor phase with hydrogen, said contacting being at a temperature between about 25° C. and about 155° C. and at a pressure of less than 5 atmospheres, in the presence of a nickel catalyst, the molar ratio of hydrogen to acrolein dimer being between about 15:1 and about 125:1, and the maximum feed rate of the acrolein dimer being not substantially in excess of 0.2 part by weight per hour per part by weight of catalyst, said catalyst having been reduced at a temperature below about 450° C., partially reoxidized by passing a gas containing free oxygen thereover until the ratio of reduced nickel to total nickel is about 55%, and again reduced by passing a gas thereover containing free hydrogen at a temperature below about 250° C.

8. A process for producing 2-hydroxymethyltetrahydropyran which comprises contacting 2-hydroxymethyldihydropyran in the vapor phase with hydrogen, said contacting being at a temperature between 250° C. and about 155° C. and at a pressure of less than 5 atmospheres, in the presence of a nickel catalyst, the molar ratio of hydrogen to 2-hydroxymethyldihydropyran being between about 15:1 and about 125:1 and the maximum feed rate of the 2-hydroxymethyldihydropyran being not substantially in excess of 0.2 part by weight per hour per part by weight of catalyst, said catalyst having been reduced at a temperature below about 450° C., partially reoxidized by passing a gas containing free oxygen thereover until the ratio of reduced nickel to total nickel is about 55%, and again reduced by passing a gas thereover containing free hydrogen at a temperature below about 250° C.

References Cited by the Examiner

UNITED STATES PATENTS

| | | | |
|---|---|---|---|
| 2,368,186 | 1/45 | Wickert et al. | 260—345.9 |
| 2,473,497 | 6/49 | Bordnick | 260—345.9 |
| 2,479,283 | 8/49 | Whetstone | 260—345.9 |
| 2,480,990 | 9/49 | Whetstone | 260—345.9 |
| 2,513,133 | 6/50 | Hatch | 260—345.9 |
| 2,610,193 | 9/52 | Whetstone | 260—345.9 |
| 2,850,508 | 9/58 | Buckley et al. | 260—345.9 |
| 3,021,342 | 2/62 | Manly | 260—345.1 |
| 3,021,343 | 2/62 | Manly | 260—345.1 |

OTHER REFERENCES

Smith: Acrolein, pp. 203–210, John Wiley & Sons, Inc., New York (1962).

IRVING MARCUS, *Primary Examiner.*

NICHOLAS S. RIZZO, WALTER A. MODANCE,
*Examiners.*